US008851488B2

(12) United States Patent  (10) Patent No.: US 8,851,488 B2
Carruyo  (45) Date of Patent: Oct. 7, 2014

(54) MODULAR CARGO DOLLY

(71) Applicant: Iscar GSE Corp, Miami, FL (US)

(72) Inventor: Israel S. Carruyo, Miami Gardens, FL (US)

(73) Assignee: Iscar GSE Corp., Miami, FL (US)

( * ) Notice: Subject to any disclaimer, the term of this patent is extended or adjusted under 35 U.S.C. 154(b) by 0 days.

(21) Appl. No.: 13/917,392

(22) Filed: Jun. 13, 2013

(65) Prior Publication Data

US 2013/0334783 A1    Dec. 19, 2013

Related U.S. Application Data

(60) Provisional application No. 61/660,344, filed on Jun. 15, 2012.

(51) Int. Cl.
    *B62D 25/20*  (2006.01)
    *B62B 1/12*   (2006.01)
    *B60P 7/08*   (2006.01)
    *B62D 21/20*  (2006.01)
    *B60P 1/52*   (2006.01)
    *B62D 63/06*  (2006.01)

(52) U.S. Cl.
    CPC . *B62B 1/12* (2013.01); *B62D 25/20* (2013.01); *B60P 7/08* (2013.01); *B60P 7/0807* (2013.01); *B62D 63/06* (2013.01); *B62D 21/20* (2013.01); *B60P 1/52* (2013.01)
    USPC .......... 280/79.11; 280/656; 410/52; 29/897.2

(58) Field of Classification Search
    CPC ............... B62D 25/20; B62D 25/2054; B62D 25/2063; B62D 63/06; B62D 21/00; B62D 21/20; B62B 3/04; B62B 3/02; B62P 7/08; B62P 7/0807; B62P 7/0892; B60P 1/64; B60P 1/6409; B60P 1/52
    USPC .......... 280/79.11, 491.1; 410/52, 77, 92, 156; 29/897.2
    See application file for complete search history.

(56) References Cited

U.S. PATENT DOCUMENTS

| 2,495,557 | A | * | 1/1950  | Walsh          | 296/184.1 |
| 3,279,631 | A | * | 10/1966 | McCartney      | 414/532   |
| 3,423,101 | A | * | 1/1969  | Boeye          | 280/46    |
| 3,902,583 | A | * | 9/1975  | Laibson et al. | 193/35 MD |
| 4,000,870 | A | * | 1/1977  | Davies         | 410/92    |
| 4,541,768 | A | * | 9/1985  | Walker et al.  | 414/535   |
| 4,780,043 | A | * | 10/1988 | Fenner et al.  | 414/502   |
| 4,787,808 | A | * | 11/1988 | Shimoji et al. | 414/531   |
| 5,218,794 | A | * | 6/1993  | Ehrlich        | 52/64     |
| 5,390,775 | A | * | 2/1995  | Herrick et al. | 193/35 R  |
| 5,749,589 | A | * | 5/1998  | Hopkins et al. | 280/47.34 |
| 6,125,984 | A | * | 10/2000 | Huber et al.   | 193/35 MD |
| 6,817,578 | B1 | * | 11/2004 | Garcia et al. | 244/137.1 |

(Continued)

*Primary Examiner* — J. Allen Shriver, II
*Assistant Examiner* — Steve Clemmons
(74) *Attorney, Agent, or Firm* — GableGotwals (57) ABSTRACT

An improved cargo dolly has at least two top rail assemblies and a frame with an inner rail having mounting brackets for receiving the top rail assemblies. Each top rail assembly spans the width of the frame but not the length of the frame and can move between an attached state and an unattached state by actuating fasteners that pass through the top rail assembly to its respective mounting brackets on the frame. The movement between the attached and unattached states occurs independently of an attached or unattached state of the other top rail assembly.

2 Claims, 10 Drawing Sheets

(56) References Cited

U.S. PATENT DOCUMENTS

| | | | |
|---|---|---|---|
| 6,935,818 B2* | 8/2005 | Hoeper et al. | 410/18 |
| 6,991,082 B2* | 1/2006 | Olson et al. | 193/35 MD |
| 7,396,069 B2* | 7/2008 | Oliver | 296/184.1 |
| 8,313,278 B2* | 11/2012 | Simmons et al. | 414/532 |
| 8,388,017 B2* | 3/2013 | Alexander | 280/656 |
| 2003/0214117 A1* | 11/2003 | Steins et al. | 280/656 |
| 2007/0222259 A1* | 9/2007 | Oliver | 296/184.1 |
| 2008/0213058 A1* | 9/2008 | Simmons et al. | 410/46 |
| 2009/0295192 A1* | 12/2009 | Hyde | 296/181.7 |
| 2011/0221168 A1* | 9/2011 | Alexander | 280/639 |
| 2013/0154218 A1* | 6/2013 | Tiilikainen | 280/79.11 |

\* cited by examiner

MODULAR CARGO DOLLY

CROSS-REFERENCE TO PENDING APPLICATIONS

This application claims priority to U.S. Provisional Pat. Appl. No. 61/660,344, titled Modular Cargo Dolly and filed on Jun. 15, 2012.

BACKGROUND OF THE INVENTION

This invention generally relates to devices and apparatuses used to improve the movement of baggage and other cargo around airports, train stations, docks, and other large areas. More particularly, the invention relates to a modular cargo dolly that makes it easier, cheaper, and safer to maintain and repair the cargo dolly.

Figure 1:
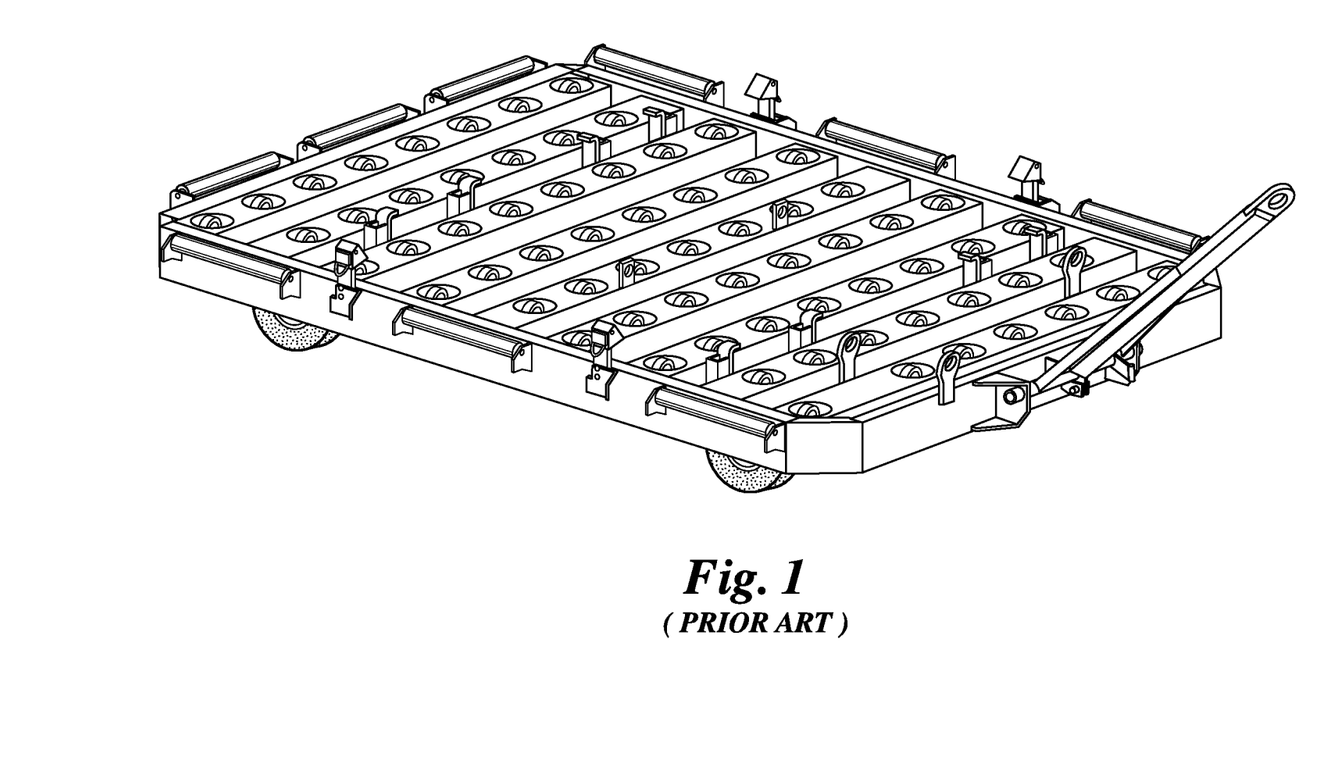
FIG. 1 is a photograph of a typical cargo dolly used in the airline industry.
Figure 2:
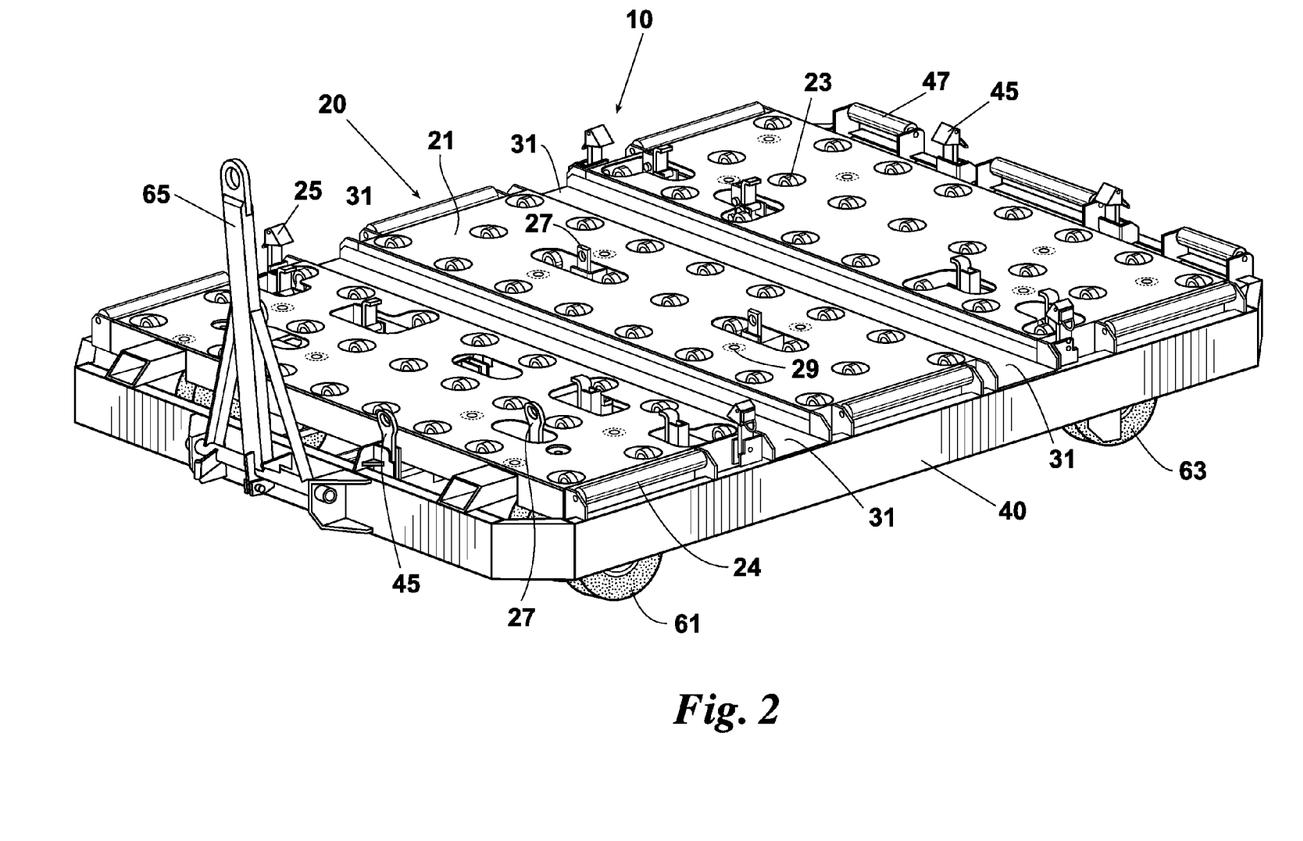
FIG. 2 is a view of a preferred embodiment of a cargo dolly made according to this invention. The removable modular front, center, and rear top rail assemblies are shown attached to the frame as they would be during use.
Figure 3:
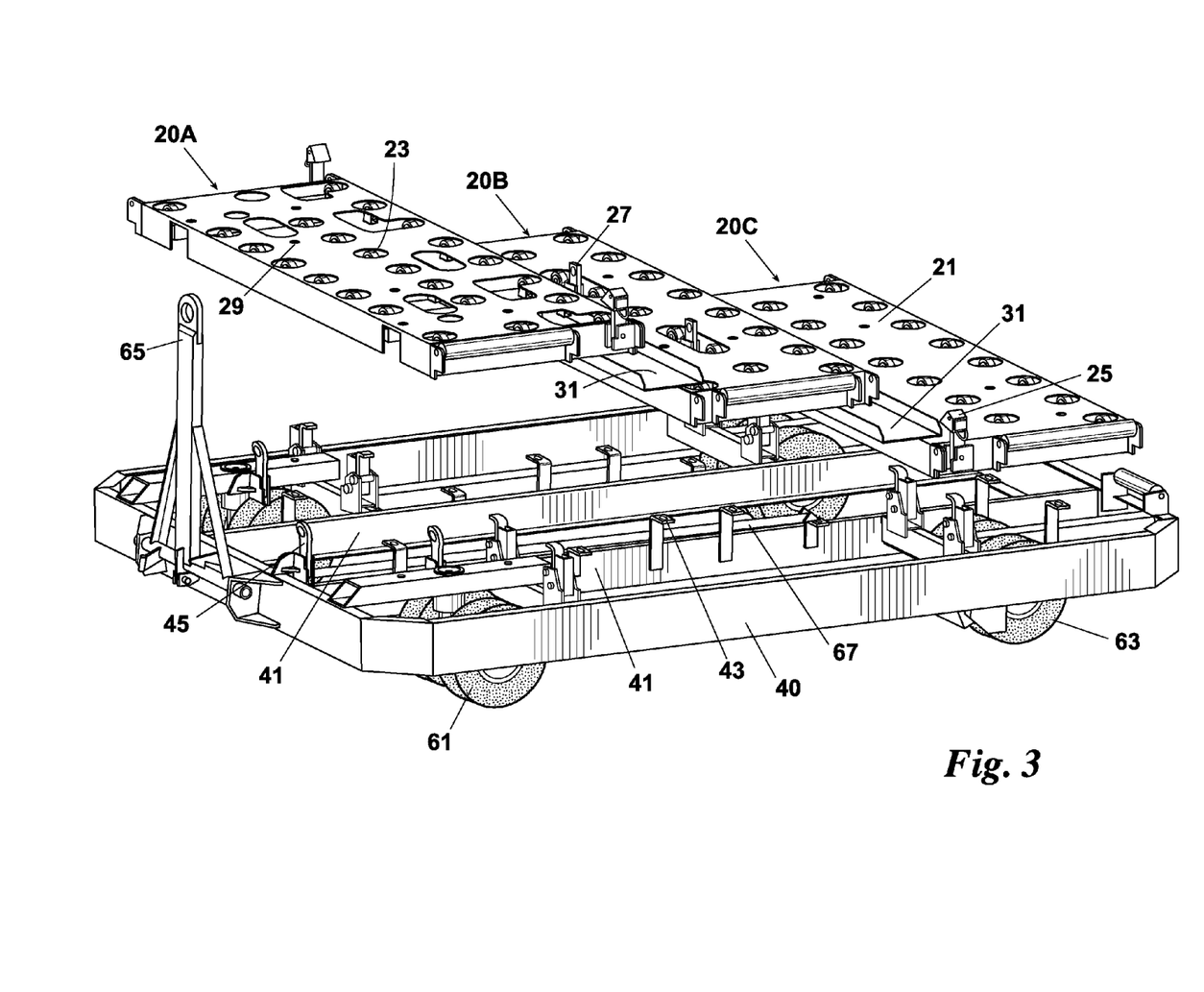
FIG. 3 is a view of a cargo dolly of FIG. 2, showing how one or more top rail assemblies may be removed and the undercarriage may be accessed without removing all of the top rail assemblies or overturning the dolly.
Figure 4:
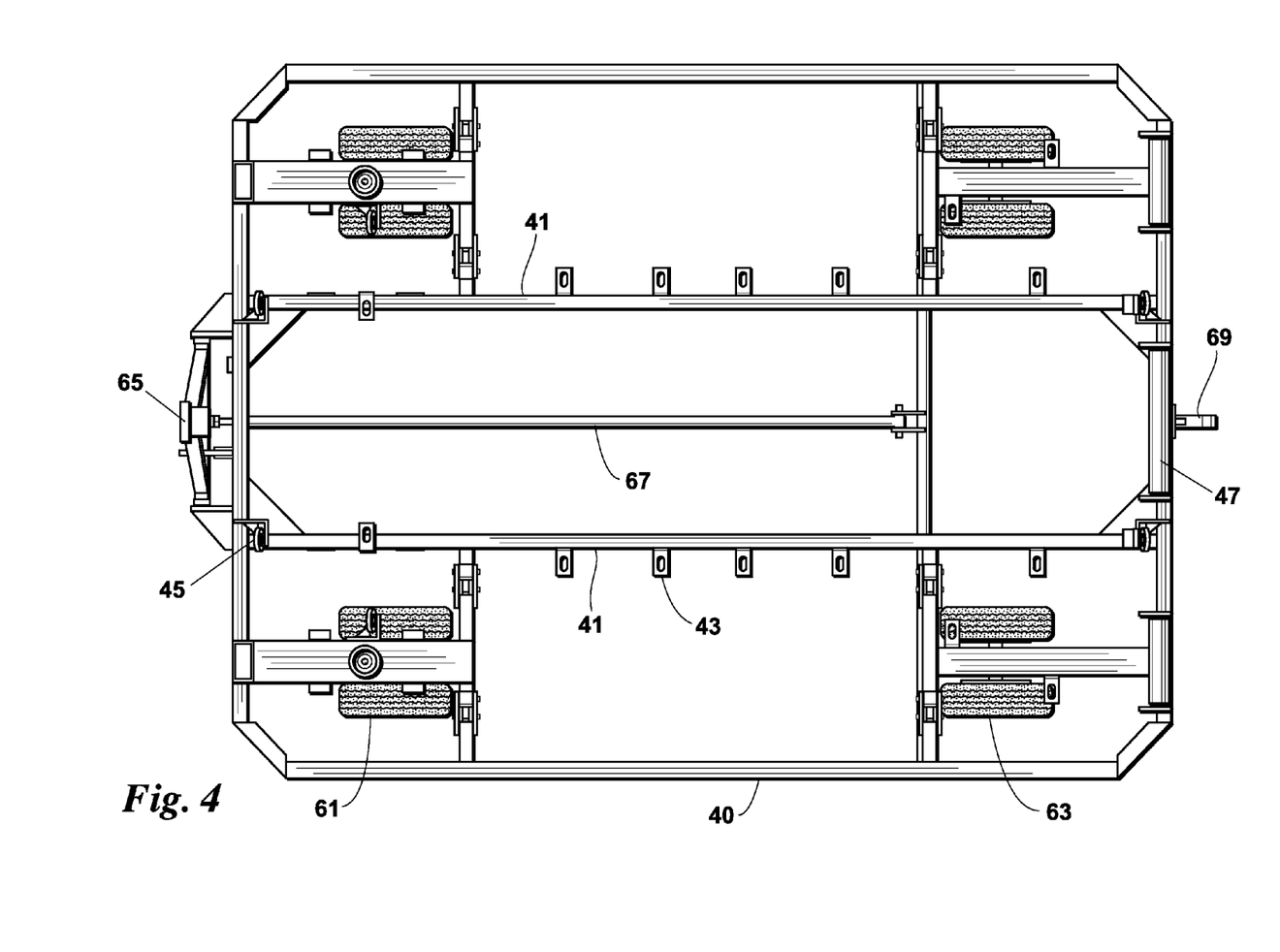
FIG. 4 is a view of the frame and undercarriage of the cargo dolly of FIG. 2 upon which the front, center, and rear top rail assemblies are mounted. The undercarriage generally includes running gear, a brake rod assembly or other braking system, and mounting brackets for each top rail assembly.
Figure 5:
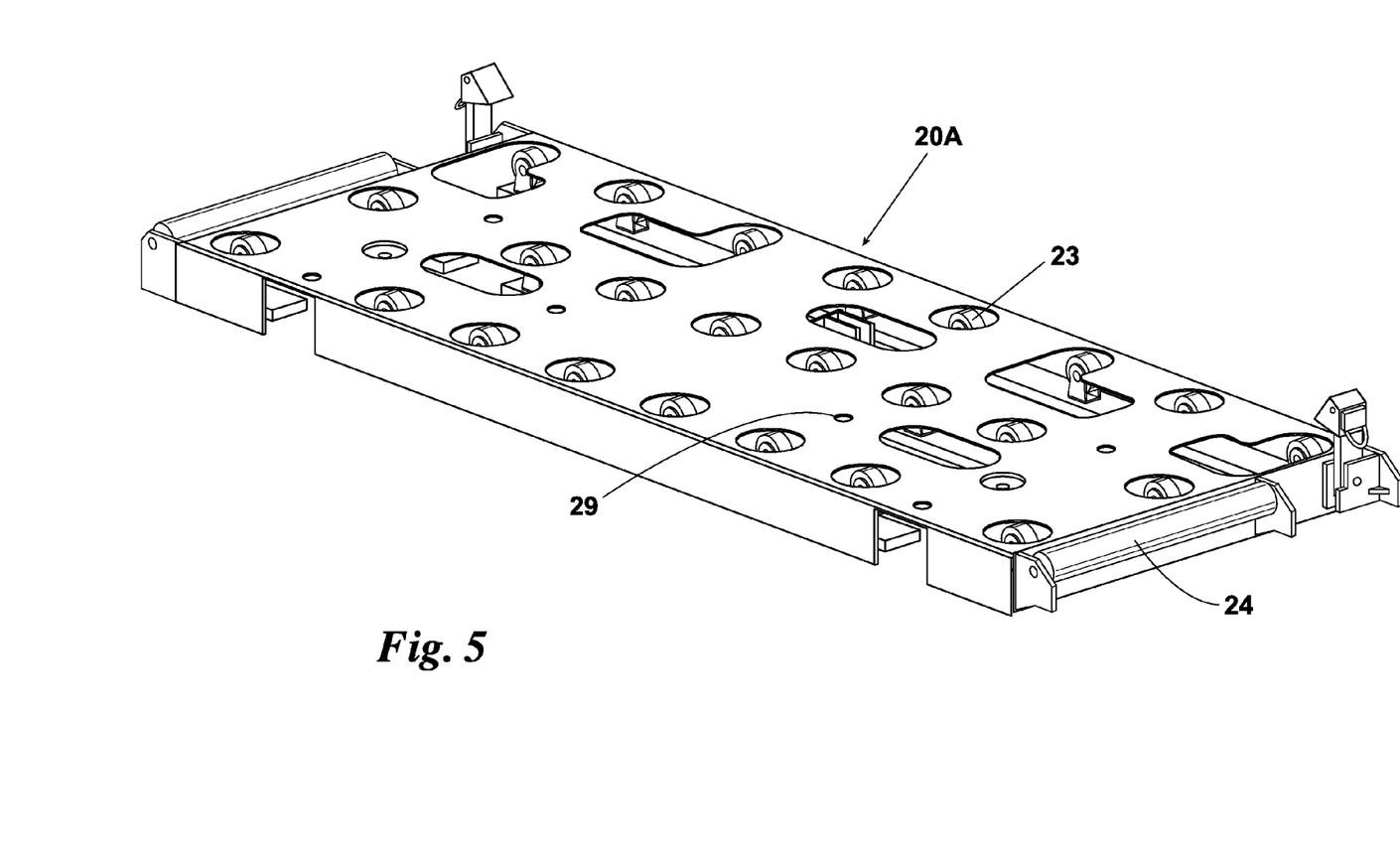
FIG. 5 is an isometric view of the removable modular front top rail assembly of the cargo dolly of FIG. 2. The front top rail assembly is mounted on the frame and is located between the handle and the center top rail assembly.
Figure 6:
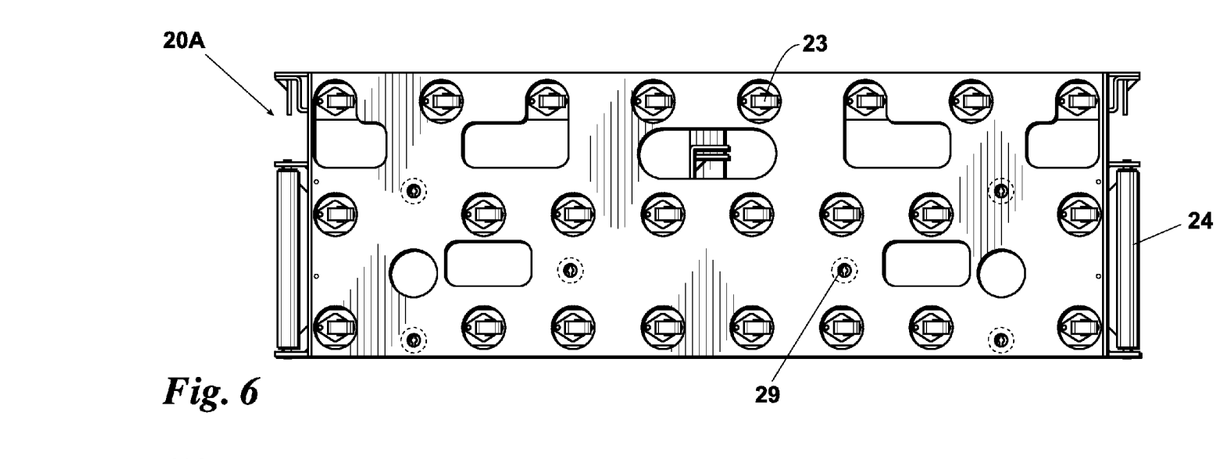
FIG. 6 is a top view of the removable modular front rail assembly of the cargo dolly of FIG. 2.
Figure 7:
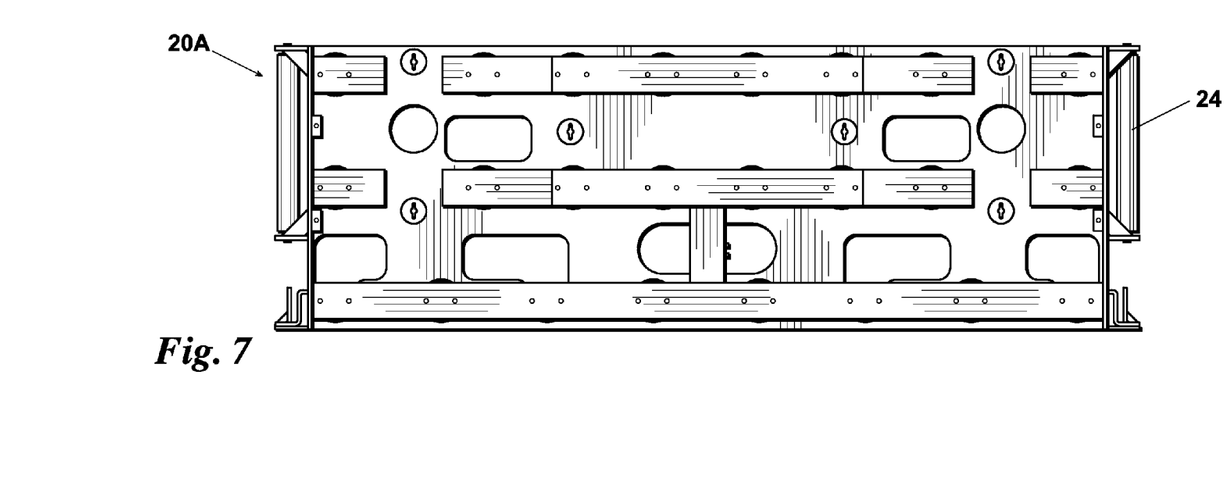
FIG. 7 is a bottom view of the removable modular front rail assembly of the cargo dolly of FIG. 2.
Figure 8:
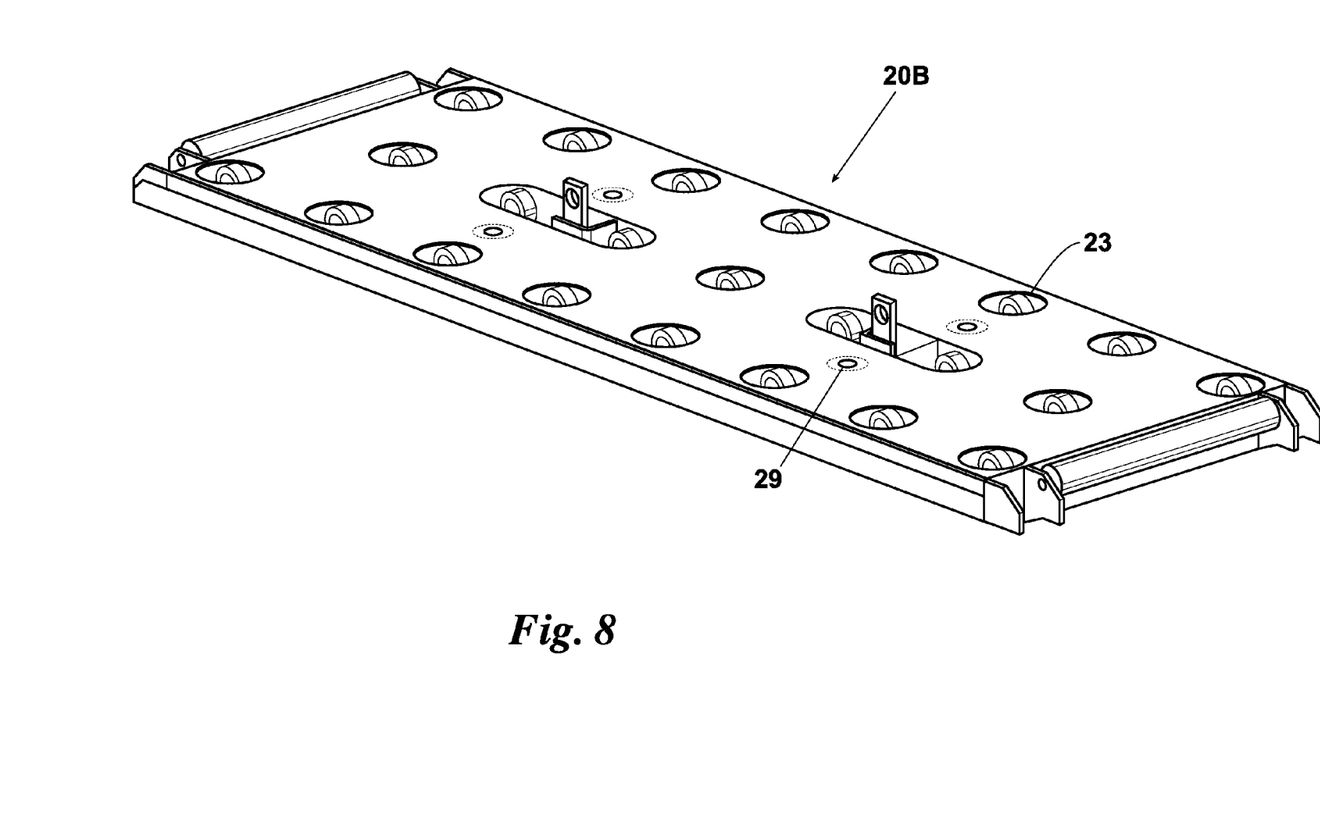
FIG. 8 is an isometric view of the removable modular center top rail assembly of the cargo dolly of FIG. 2. The center top rail assembly is mounted on the frame and is located between the front and rear top rail assemblies.
Figure 9:
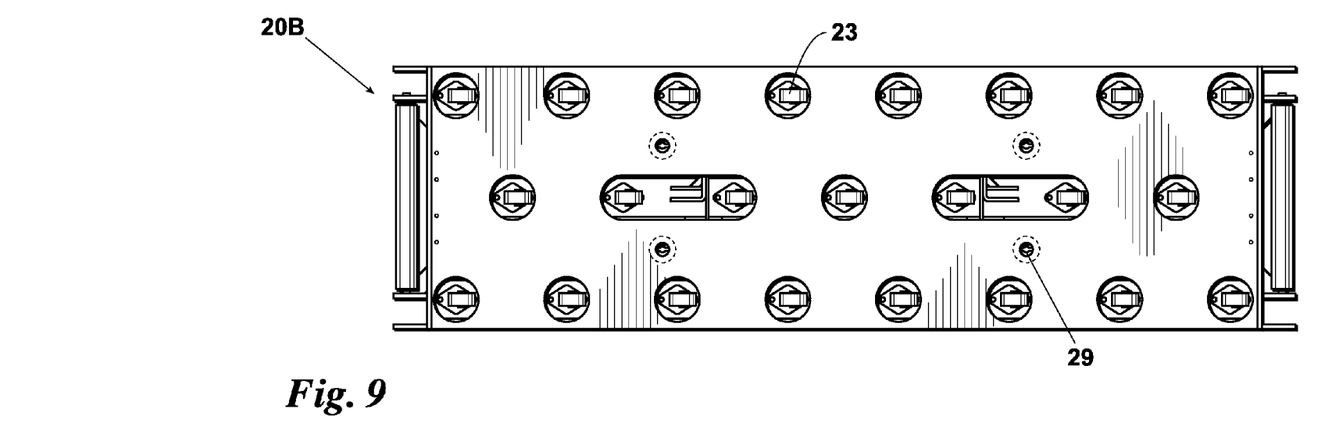
FIG. 9 is a top view of the removable modular center top rail assembly of the cargo dolly of FIG. 2.
Figure 10:
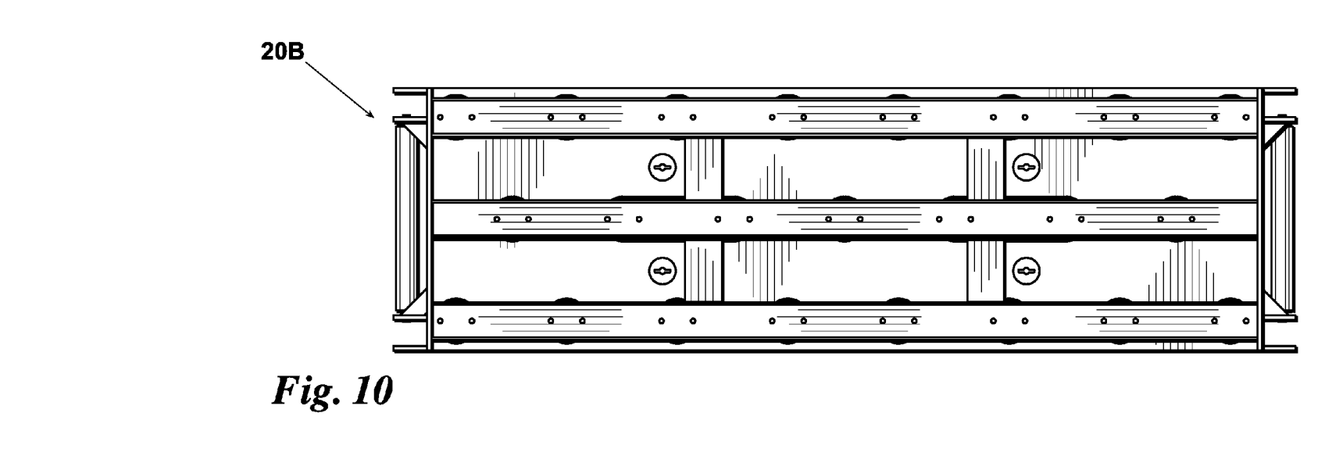
FIG. 10 is a bottom view of the removable modular center top rail assembly of the cargo dolly of FIG. 2.
Figure 11:
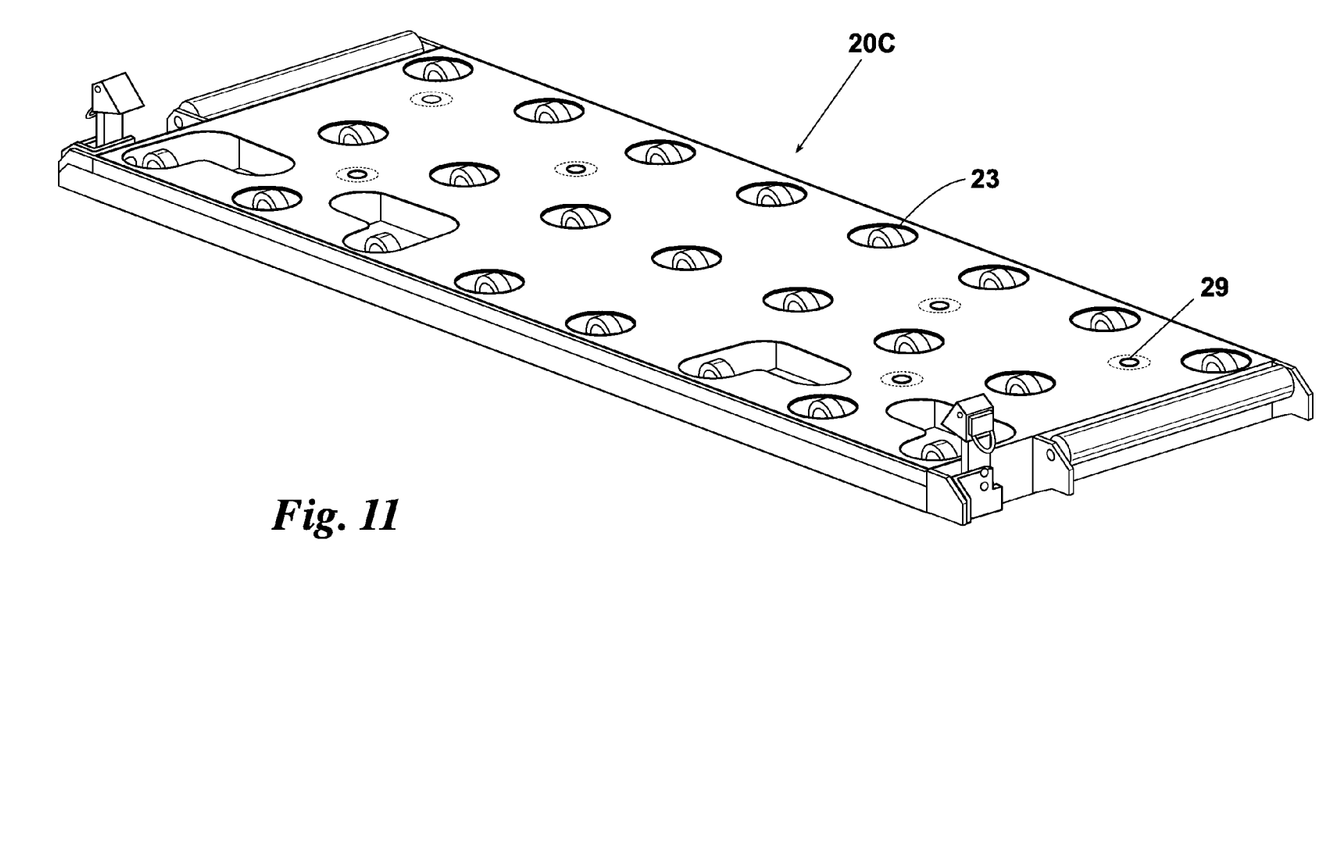
FIG. 11 is an isometric view of the removable modular rear top rail assembly of the cargo dolly of FIG. 2. The rear top rail assembly is mounted on the frame and is located between the center top rail assembly and the edge of the frame farthest from the handle.
Figure 12:
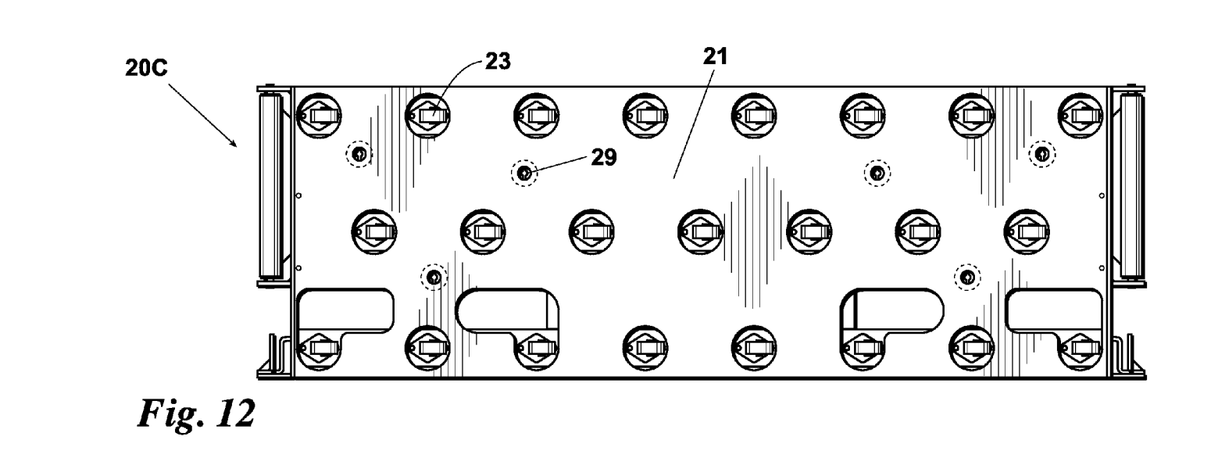
FIG. 12 is a top view of the removable modular rear top rail assembly of the cargo dolly of FIG. 2.
Figure 13:
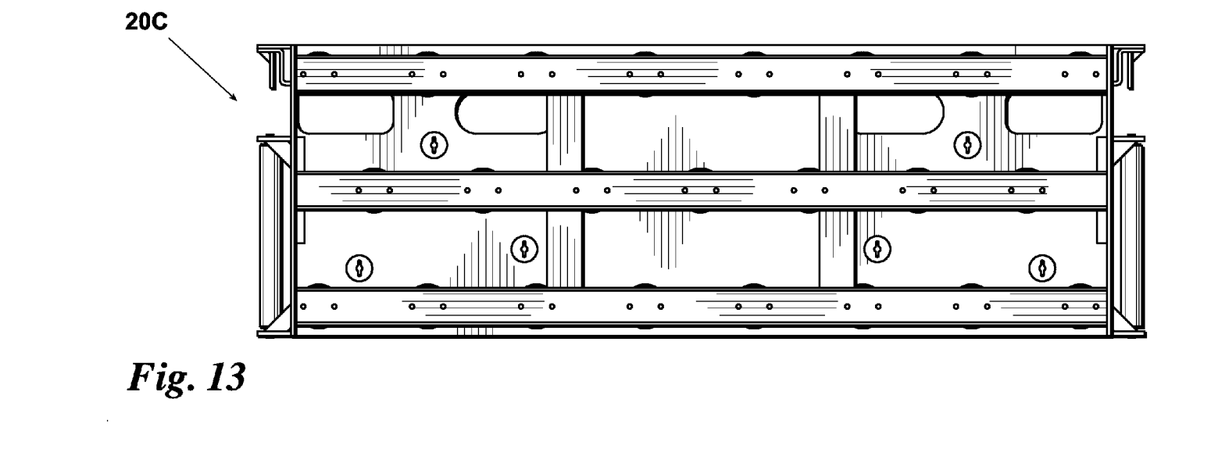
FIG. 13 is a bottom view of the removable modular rear top rail assembly of the cargo dolly of FIG. 2.

Cargo dollies that are currently available in the marketplace are welded together to form a single unit (see FIG. 1). As a result, the dollies cannot be disassembled for cleaning, maintenance, or repair. The unit must also be overturned or flipped to reach some of the components of the undercarriage, such as the running gear, brake systems, and tires. This can be dangerous to maintenance crews and may require the use of heavy machinery, such as cranes or forklifts, which is expensive and can only be operated in large spaces.

Because of the equipment and space requirements, damaged cargo dollies are generally sent to a secondary facility for repair, which results in increased logistical issues and additional costs. In addition, the dollies themselves often remain out-of-service for extended periods of time, making them less productive and cost-efficient to operate.

Ramp equipment maintenance departments all over the airline system often neglect the maintenance of cargo dollies because of the dollies high rate of use, which leaves little time to perform routine maintenance and repair. Because the dollies require the removal and handling of so many parts (about 150 bolts or screws and about 78 individual parts) just to do a basic overhaul, unusable units simply get stored in a corner of the maintenance shop. Those stored units then get cannibalized for parts until they reach a point beyond economical repair. Despite this state of affairs, the design of the prior art cargo dolly of FIG. 1 has remained unchanged for at least 40 years, if not more. Therefore, there is a long felt but unmet need to improve upon this design.

SUMMARY OF THE INVENTION

A cargo dolly made according to this invention is comprised of a frame and a plurality of removable modular top rail assemblies that form the deck of the cargo dolly. Each top rail assembly can move between the attached and unattached state independently of the other top rail assemblies.

In one embodiment of the invention, the cargo dolly includes a frame having an inner rail extending lengthwise with mounting brackets located along a portion of its length and at least two top rail assemblies, each having at least one lock and a deck surface with rollers interspersed along the deck surface. Each top rail assembly spans the width of the frame but not the length of the frame and can move between an attached state and an unattached state by actuating fasteners that pass through the top rail assembly to its respective mounting brackets on the frame, the movement between the attached and unattached states occurring independently of an attached or unattached state of the other top rail assembly.

When compared to conventional cargo dollies, the inventive cargo dolly is more cost efficient, easier to fabricate, and safer to operate, maintain, and repair.

ELEMENTS AND NUMBERING USED IN THE DRAWINGS

10 Cargo dolly
20 Top rail assembly
21 Deck surface
23 Deck roller
24 End roller
25 Lock
27 Lock
29 Fastener
31 Channel for walkway or forklift
40 Frame
41 Inner rail
43 Mounting bracket
45 Lock
47 End roller
61 Fixed running gear
63 Caster-style running gear
65 Tow bar 67 Brake system
69 Rear hitch

DETAILED DESCRIPTION OF THE PREFERRED EMBODIMENTS

A cargo dolly made according to this invention has modular top rail assemblies that form the deck of the dolly. Each top rail assembly can be separately removed from the other assemblies and from the frame of the dolly for cleaning, maintenance, or repair. Alternatively, a damaged top rail assembly can be replaced with a new or repaired assembly without scrapping the entire dolly. Removing the top rail assemblies also facilitates access to and maintenance of the inner parts of the dolly, such as the running gear and brake systems. This modification makes the dollies easier to maintain and, in tests conducted by the inventor, reduced the time that the dollies are out of service by as much as 70 percent.

Referring to FIGS. 2-13, in a preferred embodiment of the invention the cargo dolly 10 is comprised of one or more removable top rail assemblies 20. Each rail assembly 20 includes a deck surface 21 which may be solid but preferably includes a plurality of deck rollers 23 and one or more end rollers 24 to facilitate the loading or unloading of baggage, pallets, and cargo ("the cargo") (not shown). Unlike prior art cargo dollies (see FIG. 1), the deck surface 21 is not welded to the frame 40. The rail assemblies 20 also preferably include locks 25, 27 to help secure the cargo as it is being transported on the dolly 10. The locks 25, 27 may be lowered or raised to accommodate different types of cargo.

Fasteners 29, such as screws, temporarily secure each rail assembly 20 to frame 40. The fasteners 29 permit the assemblies 20 to be easily removed from frame 40 whenever a portion of the dolly 10 needs to be disassembled and inspected, maintained or repaired.

The frame 40 of the dolly 10 includes a pair of inner rails 41 with attachment points, such as L-shaped mounting brackets 41, to receive the assemblies 20. The frame 40 (see FIG. 4), which may be a welded steel frame, houses the fixed and caster-style running gear 61, 63 respectively, and may include a mechanical brake system 67, a tow bar 65, and a rear hitch 69. The frame 40 may also can include various locks 45 and rollers 47.

In a preferred embodiment, the dolly includes a front top rail assembly 20A, a center top rail assembly 20B, and a rear top rail assembly 20C, each secured by fasteners 29 to the mounting brackets 41 of the frame 40. The rail assemblies 20A, 20B, 20C include locks 25, 27 that are used to restrain the different type of cargo corresponding to the type's respective loading configuration. As shown in FIGS. 2 and 5-7, the rollers 23, 24 and locks 25, 27 may vary according to each assembly's 20 respective position on the frame 40, preventing rear top rail assembly 20C from being interchangeable with front top rail assembly 20A at the forward end of the frame 40 and middle top rail assembly 20C from being interchangeable with rail assemblies 20A and 20C. The locks 45 on the frame 40 may also vary. Located between adjacent assemblies 20A, 20B, 20C are channels 31 which serve as a walkway or access for a forklift.

A key advantage of cargo dolly 10 over the prior art dolly of FIG. 1 is that an end user is able repair the dolly in a lot of less time it would take to actually disassemble the whole top of a welded unit. For example, a commercial embodiment of cargo dolly 10, allows mechanics at Iscar Ground Services Corp. (Miami, Fla.) to do a 90% top overhaul by just removing 20 bolts compared to approximately 150 bolts or screws when doing the same overhaul of the prior art design. Additionally, because the modules of the dolly 10 are pre-assembled, the handling, removal and re-installation of approximately 78 individual parts that are required for the overhaul or maintenance schedule of the prior art dolly are eliminated.

No other known manufacturer of this type of equipment in the USA, Europe, Middle East and Asia has the unique and inventive features of cargo dolly 10. Research conducted by Iscar Ground Services Corp. has shown that maintenance managers and mechanics at airlines and ground handling service providers consider cargo dolly 10 the best solution available for improving the quality of, and reducing the time for (and therefore cost of) cargo dolly maintenance.

The preferred embodiments describe here are not all of the possible embodiments that a person of ordinary skill could derive from the disclosure. Therefore, the scope of the invention is limited by the following claims and cover equivalent elements to those specifically listed in the claims.

What is claimed:

1. An improved cargo dolly, the improvement comprising:
a frame having an inner rail extending lengthwise with mounting brackets located along a portion of its length
at least two top rail assemblies, one of the top rail assemblies being located toward a forward end of the frame and the other being located toward a rearward end of the frame;
each top rail assembly having a deck surface with rollers interspersed along the deck surface and at least one cargo lock moveable to a position that prevents movement of a piece of cargo as the dolly moves;
wherein each top rail assembly spans the width of the frame but not the length of the frame and can move between an attached state and an unattached state by actuating fasteners that pass through the top rail assembly to its respective mounting brackets on the frame, the movement between the attached and unattached states occurring independently of an attached or unattached state of the other top rail assembly, the rearward top rail assembly having its own position on the frame and not being interchangeable at the forward end of the frame with the forward top rail assembly.

2. An improved cargo dolly having a rectangular-shaped frame, a tow bar at a forward end, a forward, a rearward, and a center top rail assembly, and a set of cargo locks configurable to prevent movement of a piece of cargo as the cargo dolly moves; each top rail assembly spaced apart from an adjacent top rail assembly by a channel spanning the width of the top rail assemblies; the top rail assemblies temporarily secured to mounting brackets located on the frame and, when secured to the mounting brackets, forming a deck surface above the frame; each top rail assembly being removable from its respective mounting brackets independent of the other top rail assembly by loosening fasteners connecting the top rail assembly to the respective mounting brackets and, when removed from the respective mounting bracket, exposing an interior portion of the cargo dolly, the rearward and center rail assemblies not being interchangeable with one another on the frame and not being interchangeable at a forward end of the frame with the forward top rail assembly.

* * * * *